US007631157B2

(12) United States Patent
Kano

(10) Patent No.: US 7,631,157 B2
(45) Date of Patent: *Dec. 8, 2009

(54) OFFSITE MANAGEMENT USING DISK BASED TAPE LIBRARY AND VAULT SYSTEM

(75) Inventor: Yoshiki Kano, Sunnyvale, CA (US)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/548,658

(22) Filed: Oct. 11, 2006

(65) Prior Publication Data

US 2007/0136519 A1 Jun. 14, 2007

Related U.S. Application Data

(63) Continuation of application No. 10/618,188, filed on Jul. 10, 2003, now Pat. No. 7,127,575.

(51) Int. Cl.
G06F 12/00 (2006.01)
G06F 13/00 (2006.01)
(52) U.S. Cl. ...................................... 711/161; 711/101
(58) Field of Classification Search .................. 711/161
See application file for complete search history.

(56) References Cited

U.S. PATENT DOCUMENTS

| 5,765,204 | A | | 6/1998 | Bakke et al. |
| 5,774,431 | A | * | 6/1998 | Bos et al. ................. 369/30.28 |
| 5,805,864 | A | | 9/1998 | Carlson et al. |
| 6,000,020 | A | * | 12/1999 | Chin et al. ................. 711/162 |
| 6,336,163 | B1 | | 1/2002 | Brewer et al. |
| 6,341,329 | B1 | | 1/2002 | LeCrone et al. |
| 6,779,058 | B2 | | 8/2004 | Kishi et al. |
| 6,834,324 | B1 | | 12/2004 | Wood |
| 7,007,129 | B2 | | 2/2006 | Sekine et al. |
| 7,032,059 | B1 | * | 4/2006 | Yamada et al. .............. 710/313 |
| 2002/0144044 | A1 | * | 10/2002 | Moon et al. ................. 710/302 |
| 2003/0050729 | A1 | | 3/2003 | Basham et al. |

(Continued)

FOREIGN PATENT DOCUMENTS

JP 2001290713 10/2001

(Continued)

OTHER PUBLICATIONS

Onton et al "IBM Total Storage™ Peer-to-Peer Virtual Tape Server Performance with VTC Data Compression," technical document, IBM Corporation Storage System Group, Tucson, AZ (2002).

(Continued)

Primary Examiner—Matt Kim
Assistant Examiner—Michael C Krofcheck
(74) Attorney, Agent, or Firm—Mattingly & Malur, P.C.

(57) ABSTRACT

A method for archiving data from a first disk-based storage device to a second disk-based storage device includes moving an emulated tape from a first element to a second element simulatively without actually moving data associated with the emulated tape. The data associated with the emulated tape is transmitted from the first disk-based storage device to the second disk-based storage device via a communication link. The data associated with the emulated tape is removed from the first disk-based storage device.

9 Claims, 11 Drawing Sheets

U.S. PATENT DOCUMENTS

| | | | |
|---|---|---|---|
| 2003/0120476 A1 | 6/2003 | Yates et al. | |
| 2004/0006702 A1* | 1/2004 | Johnson | 713/189 |
| 2004/0034811 A1* | 2/2004 | Trimmer et al. | 714/13 |
| 2004/0044842 A1 | 3/2004 | Trimmer et al. | |
| 2004/0044863 A1 | 3/2004 | Trimmer et al. | |
| 2004/0111251 A1* | 6/2004 | Trimmer et al. | 703/26 |
| 2004/0148486 A1* | 7/2004 | Burton | 711/202 |
| 2004/0153614 A1 | 8/2004 | Bitner et al. | |
| 2004/0153739 A1* | 8/2004 | Trimmer et al. | 714/7 |
| 2004/0181628 A1 | 9/2004 | Trimmer et al. | |

FOREIGN PATENT DOCUMENTS

| | | |
|---|---|---|
| JP | 2002132618 | 5/2002 |

OTHER PUBLICATIONS

Atsushi Nakata, "Backup Changes with Use of Hard Disks", Nikkei Windows Pro vol. 72 p. 62-77, Mar. 1, 2003.

"Storage Product Lineups meeting wide variety of needs from small scale to a large scale", Business Communication vol. 40 p. 94-95, Jan. 1, 2003.

Translation of: Nakata, Atsushi, "Backup Changes with Use of Hard Disks", Nikkei Windows Pro vol. 72 p. 62-77, Mar. 1, 2003.

Translation of: "Storage Product Lineups meeting wide variety of needs from small scale to a large scale", Business Communication vol. 40 p. 94-95, Jan. 1, 2005.

Japanese Patent Office, Office Action dated Oct. 10, 2008.

* cited by examiner

370

| Local Port (374) | Local LUN (376) | Vault Port (378 Pair setting) | Vault LUN (380) |
|---|---|---|---|
| 3 | 1 | 1 | 5 |
| 3 | 2 | 1 | 6 |
| ... | ... | ... | ... |
| 4 | 3 | 2 | 7 |
| 4 | 4 | 2 | 8 |

372

Pair setting

| Local Port | Local LUN | Vault Port | Vault LUN |
|---|---|---|---|
| 5 | 5 | 0 | 1 |
| 5 | 6 | 0 | 2 |

OFFSITE MANAGEMENT USING DISK BASED TAPE LIBRARY AND VAULT SYSTEM

CROSS-REFERENCE TO RELATED APPLICATIONS

This present application is a continuation application of U.S. application Ser. No. 10/618,188, filed on Jul. 10, 2003 and is incorporated herein by reference.

BACKGROUND OF THE INVENTION

The present invention relates to a storage system, in particular a disk-based tape emulation storage device.

Data is the underlying resources on which all computing processes are based. With the recent explosive growth of the Internet and e-business, the demand on data storage systems has increased tremendously. There are many types of storage devices, e.g., semiconductor devices, magnetic disk, and magnetic tapes, that may be used to store data. Each of these types of storage devices have different access speeds and costs associated thereto. The semiconductor devices are generally the fastest and also the most expensive. Accordingly, they are not commonly used in data centers where massive amounts of data need to be stored.

Generally, magnetic disks and tapes are the storage devices of choice for the data centers since they tend to be considerably cheaper than the semiconductor devices. The storage system for a data center generally has multiple processors and includes sophisticated operating systems for quickly reading and writing massive amounts of data.

Data centers or storage systems commonly includes a plurality of storage units or subsystems. Some are configured to be primary storage devices, and others are configured to be secondary storage devices. The primary storage devices are designed to store active data that users may access, whereas the secondary storage devices serves as back-up devices to be used in case the primary storage devices experience failure. The secondary devices are also used to store or archive "inactive" or "stale" data that the primary device does not need, so that the storage capacity of the primary devices may be freed-up for new data. As used herein, the term "archiving" refers to copying data from a first storage device to a second storage device and then deleting the data stored in the first storage device, so that the storage capacity of the first storage device is freed-up for new data.

The primary storage device is located at a primary site, and the secondary storage device is located at a secondary site that may be dozens, hundreds, or even thousands of miles apart from the primary site.

The magnetic disk storage devices are commonly used in the primary storage devices for "active" data because access to specific data in a magnetic disk storage device is more rapid than access to data in a magnetic tape device. On the other hand, the magnetic tape devices are used in the secondary storage devices or vaults to archive or back-up data due to its relatively low cost.

However, the use of the magnetic tape devices in the secondary site poses some problems. The "inactive" data need to be copied onto a tape and then the tape physically shipped or delivered to the secondary site. In addition, the archived data cannot be made to the user quickly since they need to be physically transferred back to the primary site and then loaded on the primary device before the users can access them. Moreover, the archived tapes need to be managed by the secondary device and generally cannot be managed remotely using the primary device.

BRIEF SUMMARY OF THE INVENTION

Embodiments of the present invention relate to a disk-based tape emulation storage device configured to provide storing or archiving of data to a secondary storage device, thereby enabling the use of legacy devices and software and minimizing the learning curves for administrators who have been trained on data archiving methods using tape-based storage devices.

In one embodiment, a method for archiving data from a first disk-based storage device to a second disk-based storage device includes moving an emulated tape from a first element to a second element simulatively without actually moving data associated with the emulated tape. The data associated with the emulated tape is transmitted from the first disk-based storage device to the second disk-based storage device via a communication link. The data associated with the emulated tape is removed from the first disk-based storage device.

In another embodiment, a method for transferring data in a storage system including a first storage subsystem and a second storage subsystem is disclosed. The method includes associating data stored in the first storage subsystem to a plurality of emulated tapes; generating a first management table associating a plurality of storage locations on the first storage subsystem to a plurality of emulated tape storage locations; generating a second management table, the second table associating the plurality of emulated tapes to the plurality of emulated storage tape locations in the first storage subsystem; moving one of the emulated tapes from a first element to a second element simulatively; transmitting data associated with the one emulated tape from the first storage subsystem to the second storage subsystem via a communication link; and removing the data associated with the one emulated tape from the first storage subsystem upon confirming the transmission of the data associated with the one emulated tape. The method further includes receiving the data associated with the one emulated tape at the first storage subsystem from the second storage subsystem after the removing step to reactivate the data associated with the one emulated tape.

In yet another embodiment, a disk array unit includes a storage area including a plurality of magnetic disks for storing data; and a storage controller including a processor to regulate data flow into and out of the storage area, a memory to store information needed to manage the storage area, a first interface coupling the disk array unit to a server, and a second interface to couple the disk array unit to another disk array unit provided at a remote site. The memory stores a management table associating a plurality of storage locations on the disk array unit to a plurality of emulated tape storage locations, the emulated tape storage locations being associated with a plurality of emulated tapes, each of the plurality of emulated tapes being associated with data in the disk array unit As used herein, the term "storage subsystem" refers to a storage apparatus or device including one or more storage controllers configured to process information and one or more storage components configured to store data (e.g., disks, tapes, etc.). Example of storage subsystem includes disk array units and disk-based tape emulation storage devices.

As used herein, the term "storage device" or "storage unit" refers to any storage apparatus configured to store data therein. Examples of storage devices include storage subsystems, hard disk drives, CD-ROM drives, and magnetic tape drives.

As used herein, the term "storage system" refers to a system including one or more storage device that is coupled to one or more information processing unit. Examples of storage systems include storage area network (SAN) systems, network areas storage (NAS) systems, and storage subsystems.

DETAILED DESCRIPTION OF THE INVENTION

Figure 1:
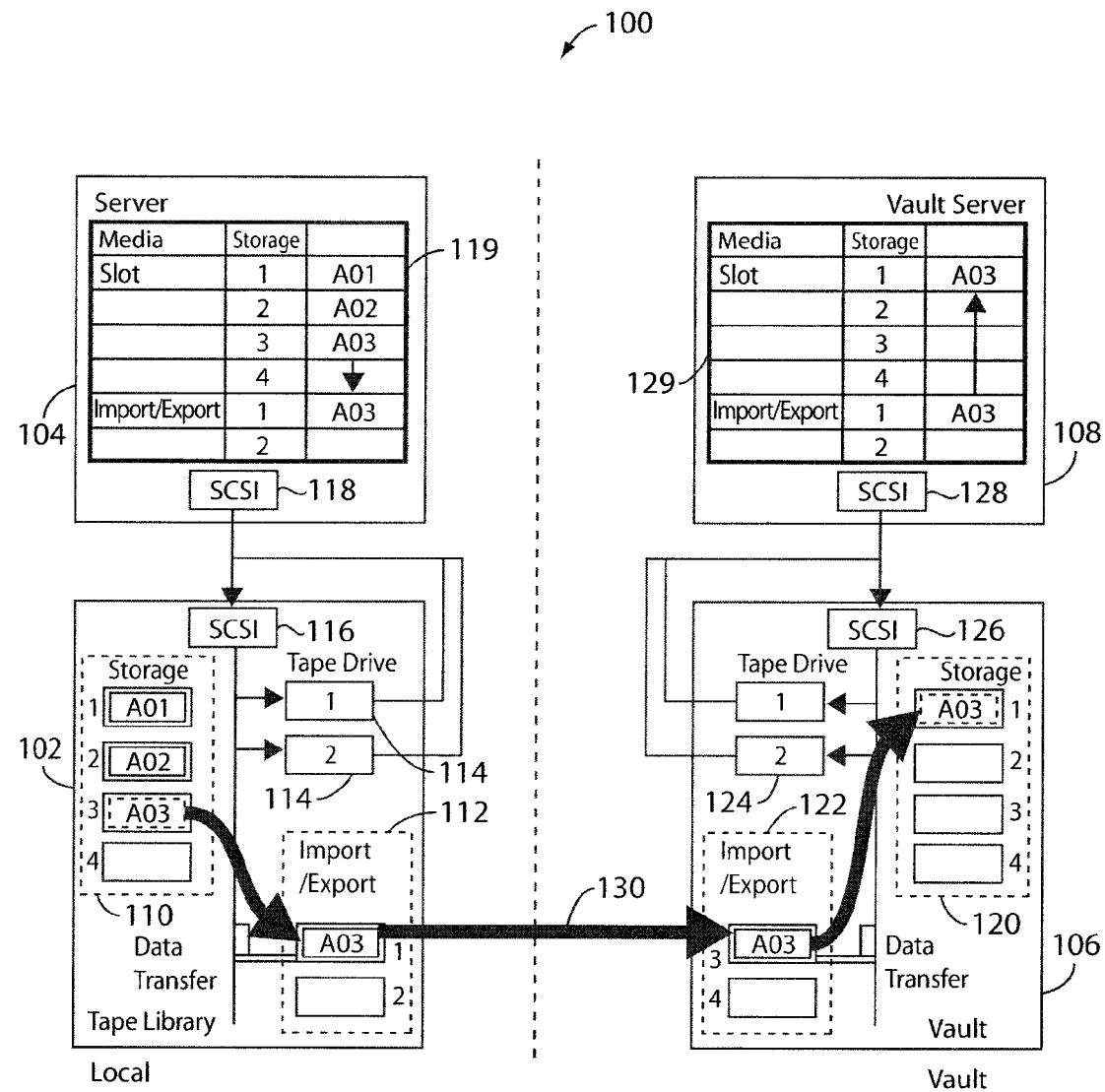
FIG. 1 illustrates a conventional storage system including a primary storage device coupled to a primary host or server and a secondary storage device coupled to a secondary host or server.

FIG. 1 illustrates a conventional storage system 100 including a primary storage device 102 coupled to a primary host or server 104 and a secondary storage device 106 coupled to a secondary host or server 108. The primary storage device is provided at a primary site, and the second storage device is provided at a secondary site. The two sites are generally separated by a long distance, e.g., 100 miles or more. The primary storage device 102 is also referred to as a local tape library, and the secondary storage device 106 is also referred to as a vault.

The primary storage device or local library 102 includes a storage area 110, an import/export element 112, and one or more tape drives 114. The storage area 110 includes a plurality of tapes for storing data. The import/export element is used to transfer data between the local library 102 to the vault 106 by physically delivering the tapes from one location to another, as will be explained later.

The local library is coupled to the server 104 via a small computer system interface (SCSI). Accordingly, a first SCSI 116 and a second SCSI 118 are provided on the local library and the server, respectively. The local server 104 retrieves information from the local library 102 to generate a database table 119, which includes information about the storage area 110, the element 112, and volume tags (e.g., barcode) of tapes, and the like, to manage the local library.

Similarly, the secondary storage device or vault 106 includes a storage area 120, an import/export element 122, and one or more tape drives 124. The storage area 120 includes a plurality of tapes for storing data. The vault is coupled to the server 108 via a SCSI. Accordingly, a third SCSI 126 and a fourth SCSI 128 are provided on the vault and the vault server, respectively. The vault server 108 retrieves information from the vault 106 to generate a database table 129, which includes information about the storage area 120, the element 122, and volume tags (e.g., barcode) of tapes, and the like, to manage the vault.

In an archiving operation from the local to the vault, the server 104 indicates that a tape with a volume tag A03 is to be moved from the storage area 102 to the import/export element 112. The local library 102 retrieves the tape A03 from the storage area and inserts it into the import export element 112. Alternatively, the data on the volume A03 may be copied onto a tape provided in the import/export element 112.

The server 104 reads the volume tag of the tape to confirm that the tape is the desired tape in question. The tape is removed from the import/export element and shipped, mailed, or delivered physically to the secondary site where the vault 106 is located. A numeral 130 indicates such physical delivery of the tape from the local to the vault.

Once the tape is received at the secondary site, the tape is inserted into the import/export element 122. The vault server 108 indicates on the table 129 that the tape is to be moved to a particular location in the storage area 120. Thereafter, the tape is moved to the location, as indicated on the database table 129.

Figure 2:
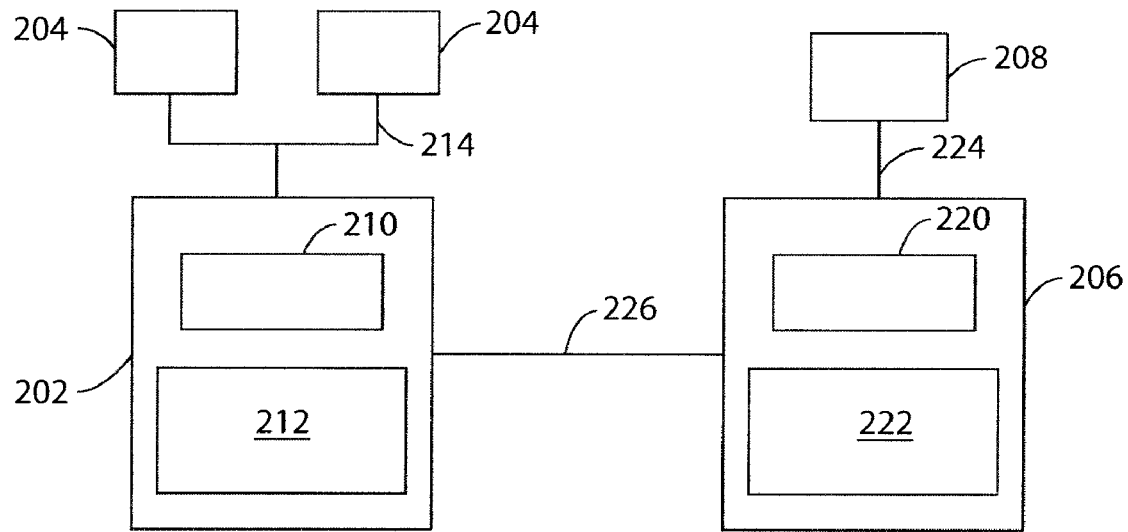
FIG. 2 illustrates a storage system having a primary storage device coupled to one or more hosts or servers and a secondary storage device coupled to one or more hosts or server according to one embodiment of the present invention.

FIG. 2 illustrates a storage system 200 having a primary storage device 202 coupled to one or more hosts or servers 204 and a secondary storage device 206 coupled to one or more hosts or servers 208 according to one embodiment of the present invention. The primary storage device 202 includes a storage controller (or controller module) 210 and a storage area 212 configured to store large amounts of data. The primary storage device 202 is coupled to the servers 204 via a communication link 214 that is SCSI, Fibre Channel (FC), or the like.

Similarly, the secondary storage device 206 includes a storage controller (or controller module) 220 and a storage area 222 configured to storage large amounts of data. The secondary storage device 206 is coupled to the servers 208 via a communication link 224 that is SCSI, Fibre Channel, or the like. The primary and secondary storage devices are coupled to each other via a communication link 226, e.g., SCSI, SAN FC, or the like.

In the present embodiment, the primary and secondary storage devices 202 and 206 are disk array units including a plurality of magnetic disks to store data and are configured as disk-based tape emulation storage devices. They are also referred to as storage subsystems. As in FIG. 1, the primary storage device 202 may be referred to as a local library, and the secondary storage device 206 may be referred to as a vault.

Figure 3:
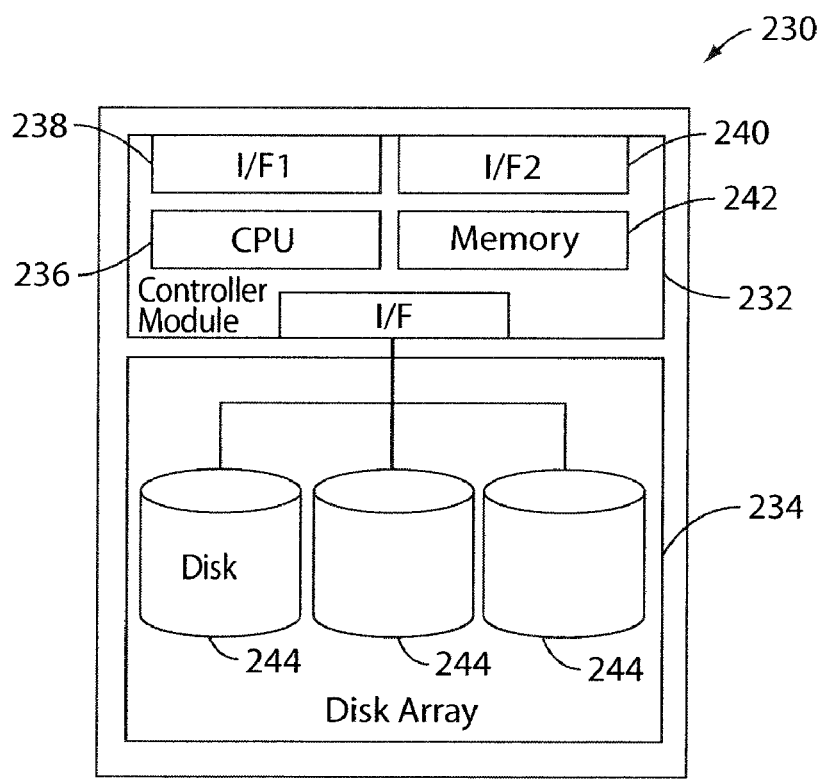
FIG. 3 illustrates a disk array unit or storage subsystem that may be used as the local library and vault according to one embodiment of the present invention.

FIG. 3 illustrates a disk array unit or storage subsystem 230 that may be used as the local library 202 and vault 206 according to one embodiment of the present invention. The disk array unit includes a controller module 232 and a storage area 234. A more detailed description of the disk array unit is provided in U.S. patent application Ser. No. 10/355,695, filed on Jan. 30, 2003, entitled "Storage System Having Virtualized Resource," assigned to the assignee of the present application, which is incorporated by reference.

The controller module 232 includes an information processing unit (or CPU) 236 to control, regulate, and manage data flow into and out of the storage area 234. A first interface 238 is used to connect to the local server 204, and a second interface 240 is used to connect to the vault 206. A memory 242 stores management information, such as a database table that corresponds to the database 119 of FIG. 1.

The storage area 234 includes a plurality of magnetic disks 244. In one embodiment, the disks 244 are arranged in a redundant array of independent disks (RAID) arrangement. A RAID arrangement permits increased availability of data and also increases input/output (I/O) performance. In such a format, a plurality of physical disk drives are configured as one logical disk drive, and the I/O requests to the logical drive are distributed to the physical disk drives in the disk array unit and are processed in parallel.

Figure 4:
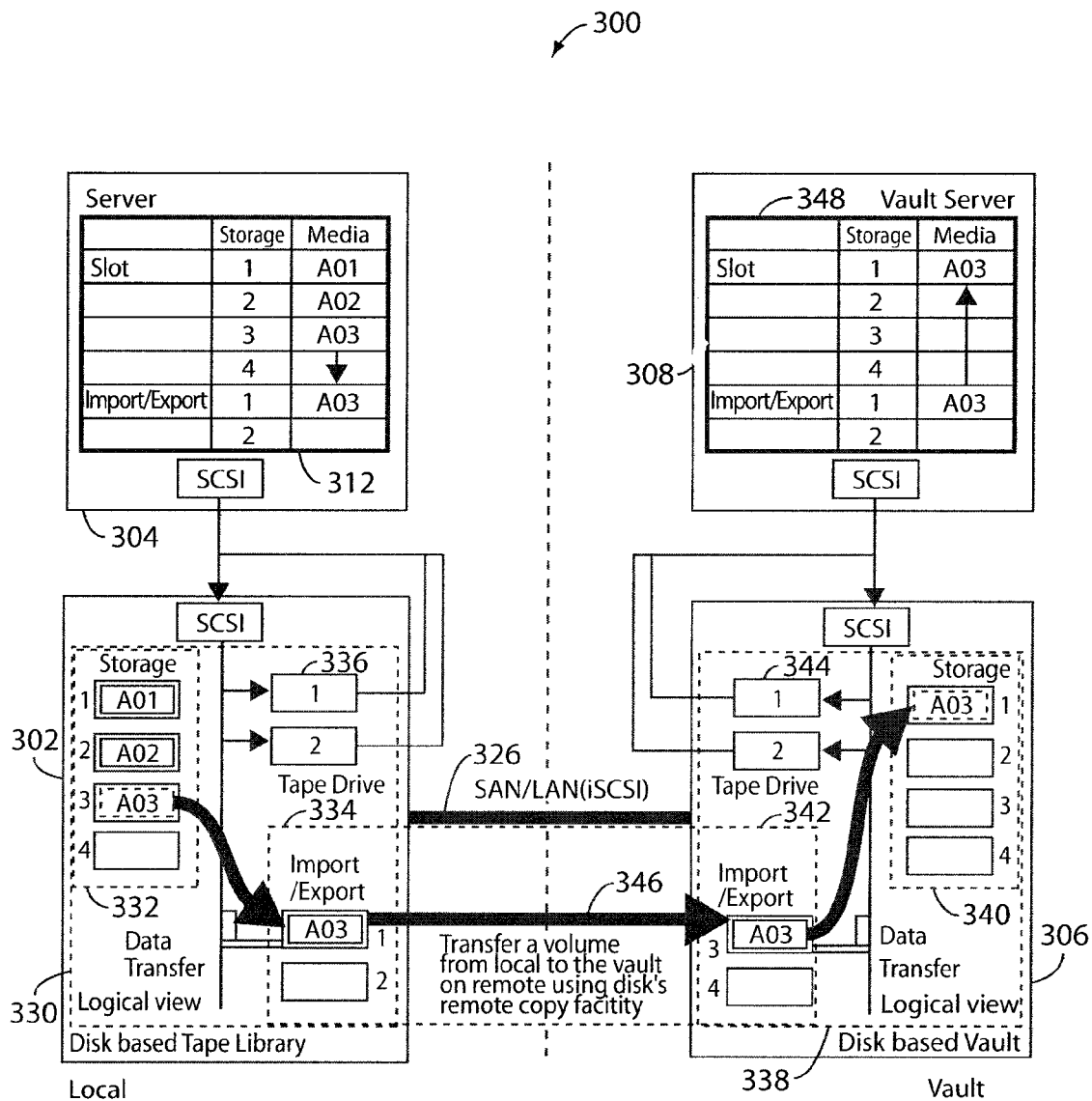
FIG. 4 illustrates a storage system including a local library coupled to a host or server and a vault coupled to a server or host according to one embodiment of the present invention.

FIG. 4 illustrates a storage system 300 including a local library 302 coupled to a host or server 304 and a vault 306 coupled to a server or host 308 according to one embodiment of the present invention. The local library 302 and vault 306 are coupled to each other via a communication link 326. The communication link may be a SCSI, FC, local area network (LAN), storage area network (SAN), or the like. The local library 302, local server 304, vault 306, and vault server 308 correspond to the local library 202, local server 204, vault 206, and vault server 208 of FIG. 2.

The local library 302 includes an emulated disk-based tape library 330 to emulate the archiving method associated with the storage system 100 of FIG. 1. The emulated tape library 330 includes an emulated storage area 332, an emulated import/export element 334, and an emulated tape drive 336. In one embodiment, the emulated library 330 is generated by the controller module of the disk array unit (see FIG. 3). Alternatively, the emulated library 330 may be generated by a host or server coupled to the local library 302.

The local server 304 includes a database table 312 to manage the emulated library. The table 312 is generated by retrieving information on the emulated storage area 332, emulated import/export element 334, and the like. The information includes the address for each of these elements, volume tags for emulated tapes, and the like.

Similarly, the vault 306 includes an emulated disk-based tape library 338 having an emulated storage area 340, an emulated import/export element 342, and an emulated tape drive 344. The vault server 308 includes a database table 348 to manage the emulated library 338.

In operation, the local server specifies data to be archived or copied to the vault by making appropriate indications on the table 312. This operation includes specifying the origin and destination addresses. The data, in the form of emulated tape A03, is retrieved and simulatively moved to the emulated import/export element 334. The data is then transferred to the emulated import/export element 342 of the vault 306. The data transfer is indicated by a data path 346. However, the data is actually transferred via the communication link 326 to the vault using a remote copy operation in one embodiment. Once the data are copied to the emulated import/export element 338 of the vault 306, the emulated library 330 verifies the copied data and then cleans the storage volume associated with the copied data.

The vault, on the other hand, notifies the end of copy operation to the vault server 308. The server then retrieves information from the emulated import/export element to read a volume tag associated with the data (i.e., the emulated tape). The data are stored to a given location in the emulated storage area 340. For example, the emulated tape A03 is stored to a slot 1 of the emulated storage area 340, as specified in the table 348. The volume tag of the emulated tape is stored in the table 348.

Figure 5:
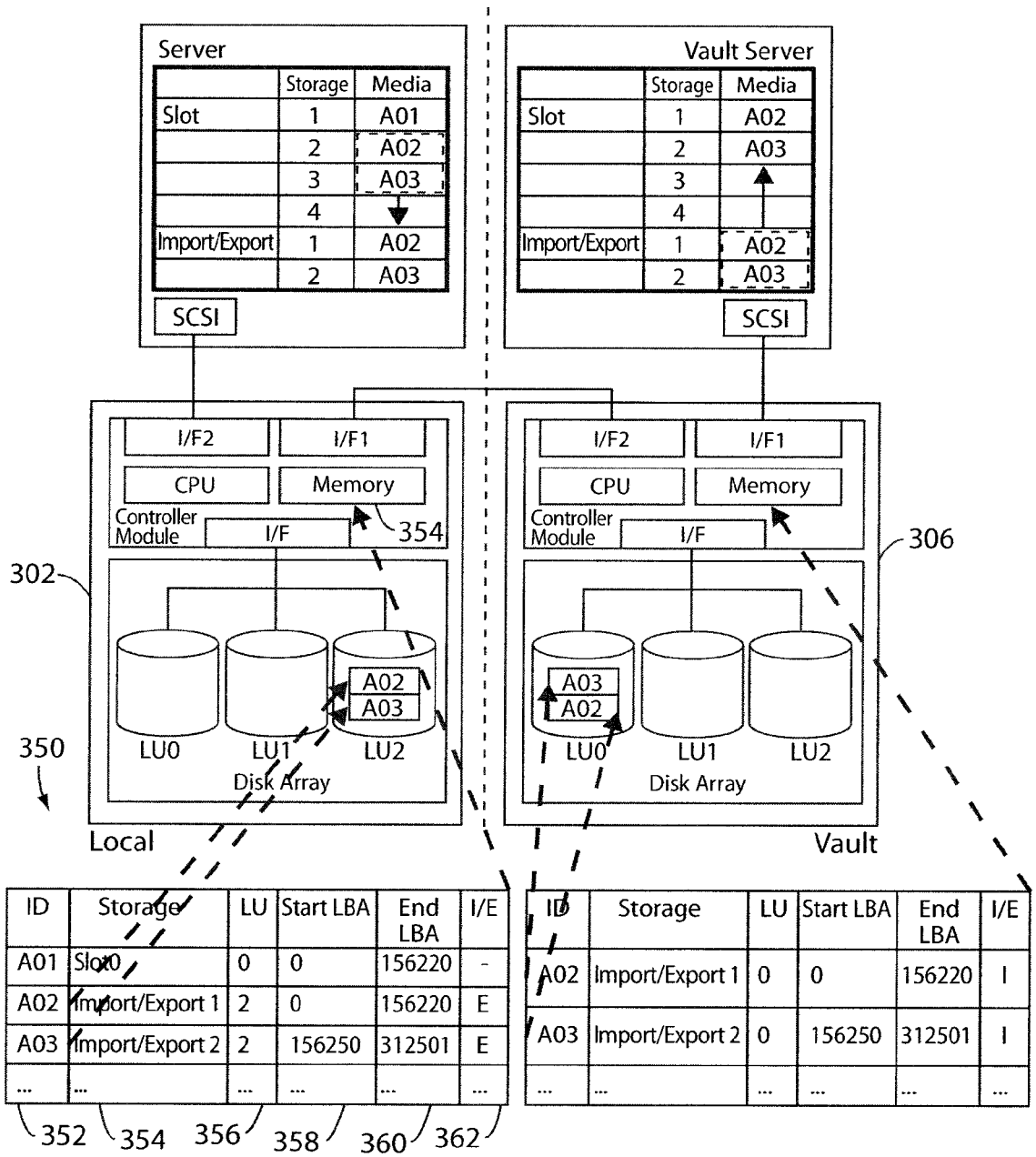
FIG. 5 illustrates an implementation of transferring emulated tapes from the local library to the vault using disk-based storage devices according to one embodiment of the present invention.

FIG. 5 illustrates an implementation involved in transferring emulated tapes from the local library to the vault using disk-based storage devices according to one embodiment of the present invention. The local library 302 and vault 306 are schematically illustrated according to their actual configurations.

A volume management table 350 is stored in a memory 354 to provide the emulated library 330 (see FIG. 4). The table 350 includes an ID field 352 to store volume tags or media IDs, a storage field 354 to store information on the emulated storage area 332 and emulated import/export element 334, a LU field 356 to store information on logical unit number, a start address field 358 to store a start address for logical block address (LBA), an end address field 360 to store the end address for LBA, and an I/E status field 362 to store information as to the operation to be performed.

The storage field 354 is used to simulatively move data from one location to another in the emulated library 330. For example, the emulated tape A03 is simulatively moved from the slot 3 in the emulated storage area 332 to the slot 1 in the emulated import/export element 334 by replacing the information stored in the storage field from "slot 3" to "import/export 1."

The LU field indicates the logical unit in the local library that actually stores the data. The start and end LBA fields identify a specific location within the logical unit where the data is stored. With respect to the I/E field 362, "E" indicates that an export operation is to be performed for the associated data, "I" indicates that an import operation is to be performed for the associated data, and "-" indicates that the data is to be left alone. During the export operation, the data or emulated tape is retrieved using the fields 356-360 and transferred to the vault 306 using a remote copy operation.

Figure 6A:
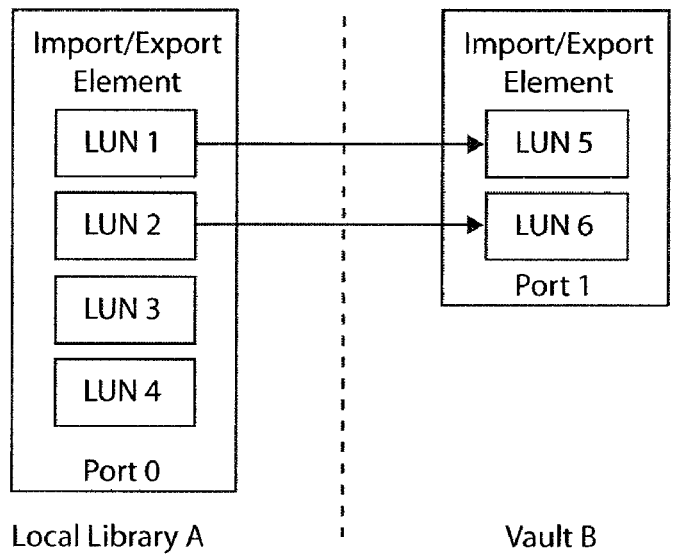
FIG. 6A illustrates mapping of import/export elements or elements between the local library according to one embodiment of the present invention.
Figure 6B:
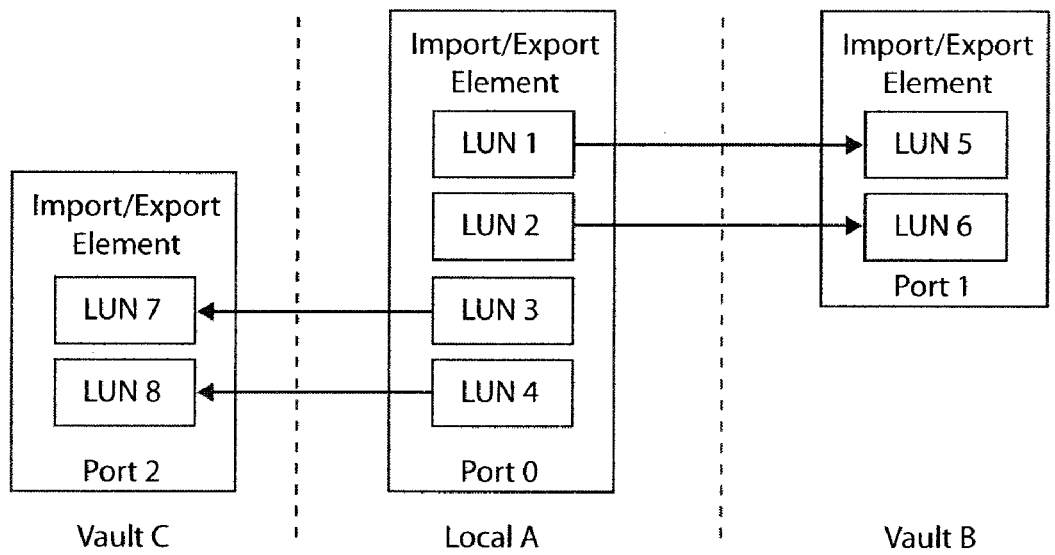
FIG. 6B illustrates mapping of import/export elements or elements between the local library according to one embodiment of the present invention.

FIGS. 6A and 6B illustrates mapping of import/export elements or elements between the local library 202 according to one embodiment of the present invention. As illustrated in FIG. 6A, emulated import/export elements of the local library 302 and the vault 306 are mapped to each other by mapping the LUN devices of respective disk array units. For example, LUN 1 and LUN 2 of the local library are mapped to LUN 5 and LUN 6 of the vault. The data is transferred from the originating LUN to the destination LUN by the controller module of the originating LUN. For example, the data stored in the LUNs 1 and 2 are transferred by the controller module of the local library since the data are originating from the local library. Using such a configuration, the local library may easily be mapped to a plurality of vaults to where data may be archived (FIG. 6B).

Figures 7A, 7B, 8:
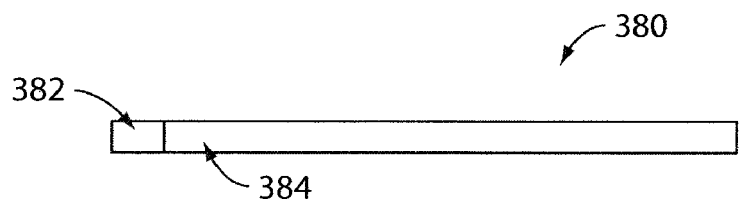
FIG. 7A illustrates a table that pair the LUNs in the local library and vault according to one embodiment of the present invention.
FIG. 7B illustrates a table that pair the LUNs in the local library and vault according to one embodiment of the present invention.
FIG. 8 illustrates data representing an emulated tape.

FIGS. 7A and 7B illustrate tables 370 and 372 that pair the LUNs in the local library and vault according to one embodiment of the present invention. The table 370 is provided in the local library, e.g., in the memory 354 (see FIG. 5). The table 370 includes a local port field 374 for ports provided in the local library, a local LUN field 376 for LUNS associated with a given port in the local library, a vault port field 378 for ports provided in the vault, and a vault LUN field 380 for LUNs associated with a given port in the vault. The table 372, which is similar to the table 370, is provided in the vault.

FIG. 8 illustrates data 380 representing an emulated tape. The emulated tape includes a volume record 382 and tape data 384. The volume record stores information relating to the volume tag, storage area, logical unit, start LBA, end LBA, I/E status, and the like. In one embodiment, the volume tag is 36 bytes. The length of the tape data 384 depends on the format of the tape emulated. In one embodiment, the tape data is 80 GB.

Figure 9:
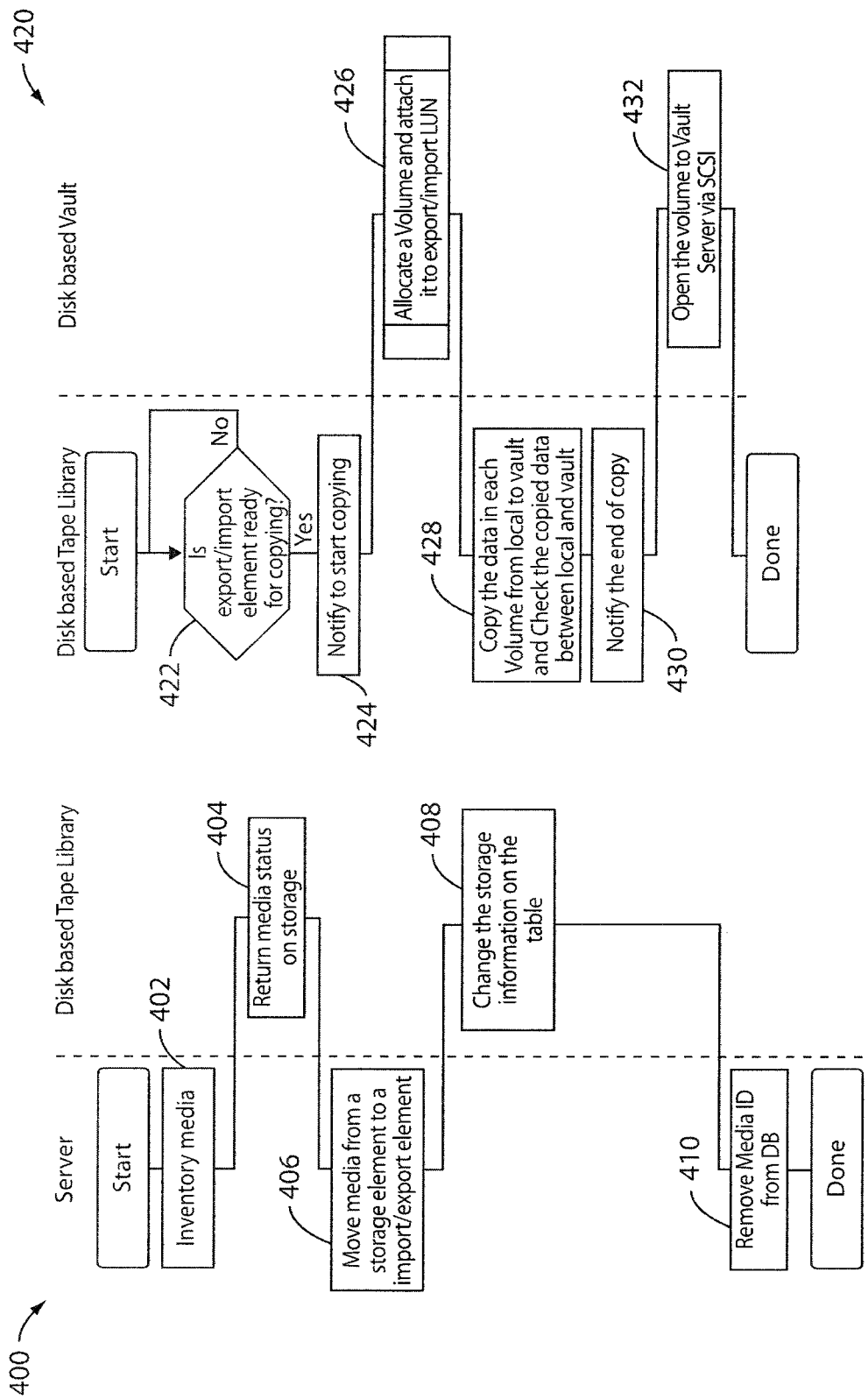
FIG. 9A illustrates a process for transferring data from the storage area to the import/export element according to one embodiment of the present invention.
FIG. 9B illustrates a process for copying or archiving the selected data from the import/export element to the vault according to one embodiment of the present invention.

FIG. 9A illustrates a process 400 for transferring data from the storage area 332 to the import/export element 334 according to one embodiment of the present invention. The server 304 requests an inventory of media from the local library 302, i.e., the disk-based tape library (step 402). The library returns the media status to the server (step 404), which includes information about the storage element or area, import/export element, volume tag, and the like. The server indicates that selected data, i.e., an emulated tape, are to be moved from the storage element 332 to the import/export element 334 (step 406). For example, this instruction is indicated on the table 312 (see FIG. 4) using the inventory information previously retrieved from the library. The library simulatively moves the selected data to the import/export element by changing the information provided in the storage field 354 (step 408). At this time the data remain at the same physical storage location, and only the information on the table 350 (see FIG. 5) is changed. The server removes the media ID from the table 312 to indicate that the selected has been moved to the import/export element (step 410). The selected data are now provided in the import/export element and ready to be copied to the vault 306.

FIG. 9B illustrates a process 420 for copying or archiving the selected data from the import/export element to the vault 306 according to one embodiment of the present invention. The library 302 checks to see if the import/export element 334 has an emulated tape to be archived to the vault (step 422). If so, the library initiates copying of the emulated tape to the vault by notifying the vault 306 (step 424) This notification is typically performed by the controller module of the library. The vault allocates a volume and attaches it to a slot in the import/export element 338 that is to receive the emulated tape (step 426). The allocated volume is selected from empty volumes provided in the vault. The vault then sends an acknowledgement to the library. The library commences transmitting the data via the communication link 336 and confirms that the data have been copied properly (step 428). The library indicates that the copy process has been completed (step 430). The vault opens the volume whereon the data have been copied to the vault server 308 via SCSI, so that the copied data may be accessed by the vault server (step 432).

In one embodiment, the data corresponding to the emulated tape that has been archived to the vault are deleted from the library to free up the storage capacity of the library. This is generally performed after the library has indicated that the copy process has been completed at step 430. Accordingly, one embodiment of the invention is directed to data archiving not to data mirroring. In addition, the vault and local servers may be the same or different servers.

Figure 10:
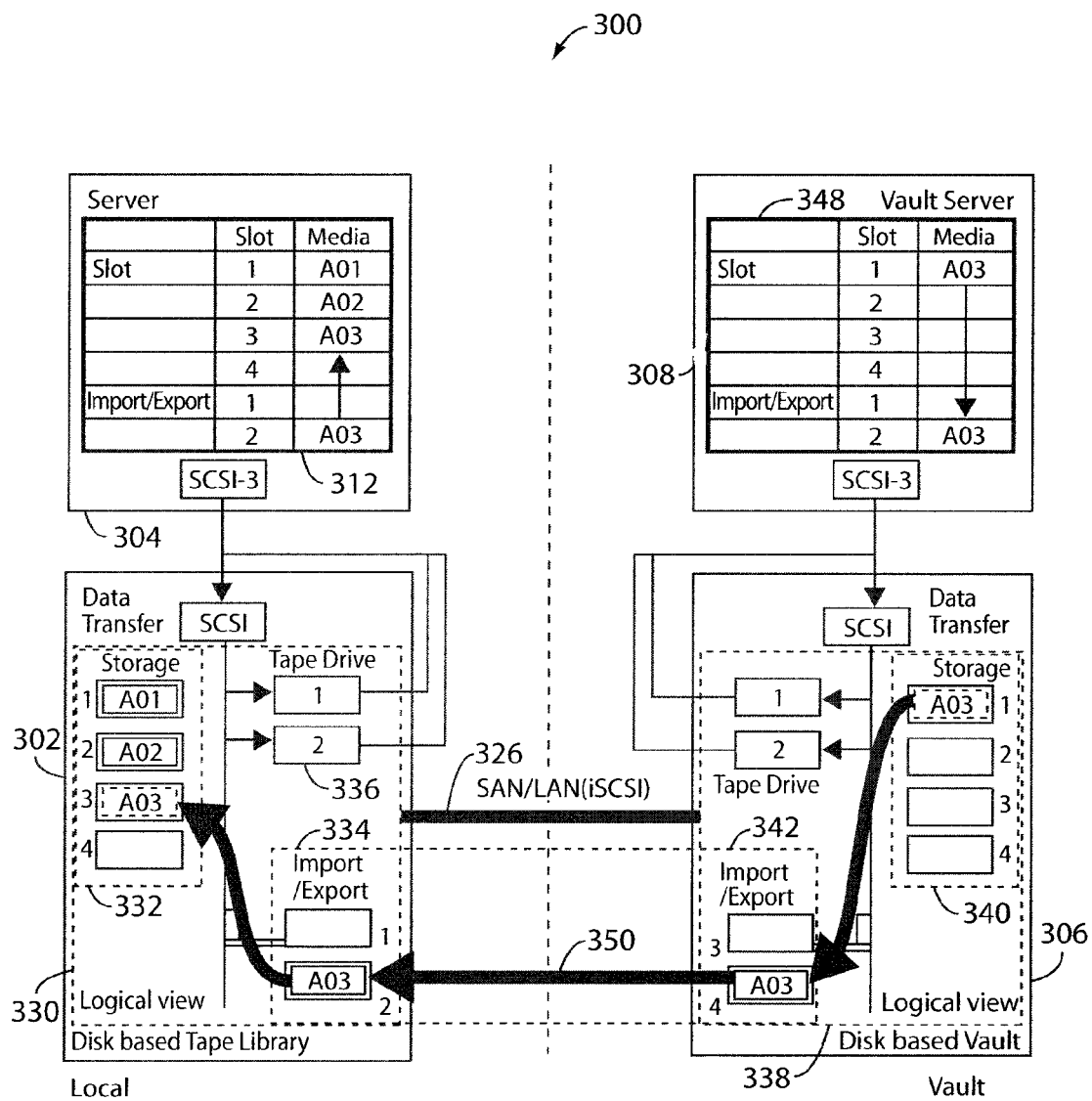
FIG. 10 illustrates a method of reactivating the data previously archived in the vault according to one embodiment of the present invention.

FIG. 10 illustrates a method of reactivating the data previously archived in the vault 306 according to one embodiment of the present invention. The vault server 308 specifies data to be transmitted to the library by making appropriate indication on the table 348. The data, identified as an emulated tape A03, is retrieved from the storage area 340 and simulatively moved to the emulated import/export element 338 of the vault. The data is then transferred to the emulated import/export element 334 of the library 302. The data transfer is indicated by a data path 350. However, the data is actually transferred via the communication link 326, as will be understood by those skilled in the art.

Once the data are copied to the emulated import/export element 334 of the library 334, the vault verifies the copied data and then cleans the storage volume associated with the copied data, so that new data could be stored there. Alternatively, the vault maintains the copied data in the storage volume.

The library 302, on the other hand, notifies to the local server 304 that the emulated tape has been received from the vault. The local server then retrieves information from the emulated import/export element to read a volume tag associated with the emulated tape. The data are stored to a given location in the emulated storage area 332, e.g., slot 3, as specified in the table 312.

Figure 11:
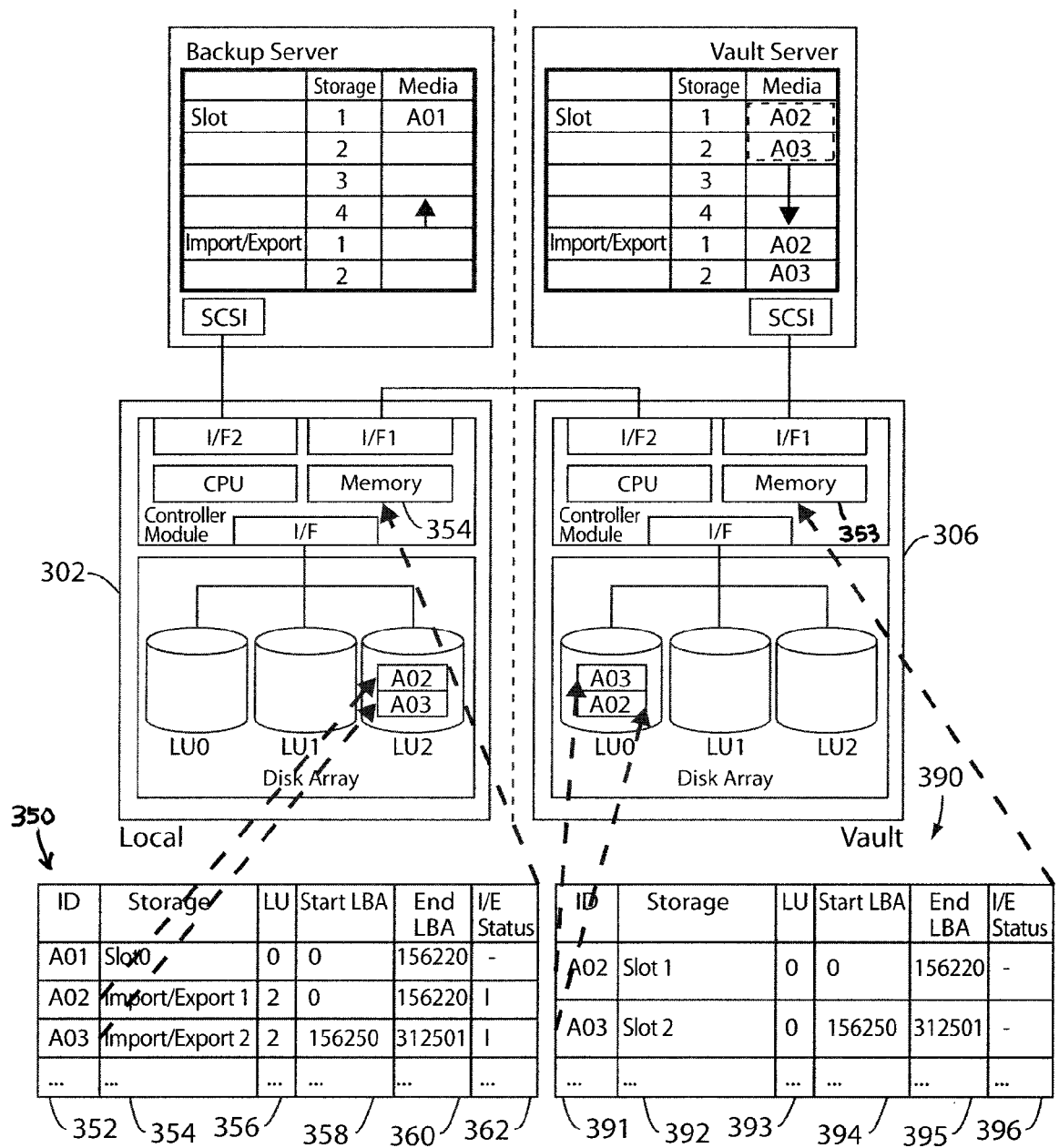
FIG. 11 illustrates an implementation involved in reactivating archived emulated tapes according to one embodiment of the present invention.

FIG. 11 illustrates an implementation involved in reactivating archived data according to one embodiment of the present invention. The local library 302 and vault 306 are schematically illustrated according to their actual configurations.

A volume management table 390 is stored in a memory 353 of the controller module. The table 390 includes an ID field 391 to store volume tags or media IDs, a storage field 392 to store information on the emulated storage area 340 and emulated import/export element 338, a LU field 393 to store information on logical unit number, a start address field 394 to store a start address for logical block address (LBA), an end address field 395 to store the end address for LBA, and an I/E status field 396 to store information as to the operation to be performed.

The storage field 392 is used to simulatively move data from one location to another in the emulated library 338. For example, the emulated tape A03 is simulatively moved from the slot 2 in the emulated storage area 340 to the slot 1 in the emulated import/export element 342 by replacing the information stored in the storage field from "slot 2" to "import/export 2."

The LU field 393 indicates the logical unit in the local library that actually stores the data. The start and end LBA fields 394 and 395 identify a specific location within the logical unit where the data is stored. With respect to the I/E field 396, "E" indicates that an export operation is to be performed for the associated data, "I" indicates that an import operation is to be performed for the associated data, and "-" indicates that the data is not be left alone. During the export operation, the data or emulated tape is retrieved using the fields 393-395 and transferred to the library 302 using a remote copy operation.

Figures 12A, 12B:
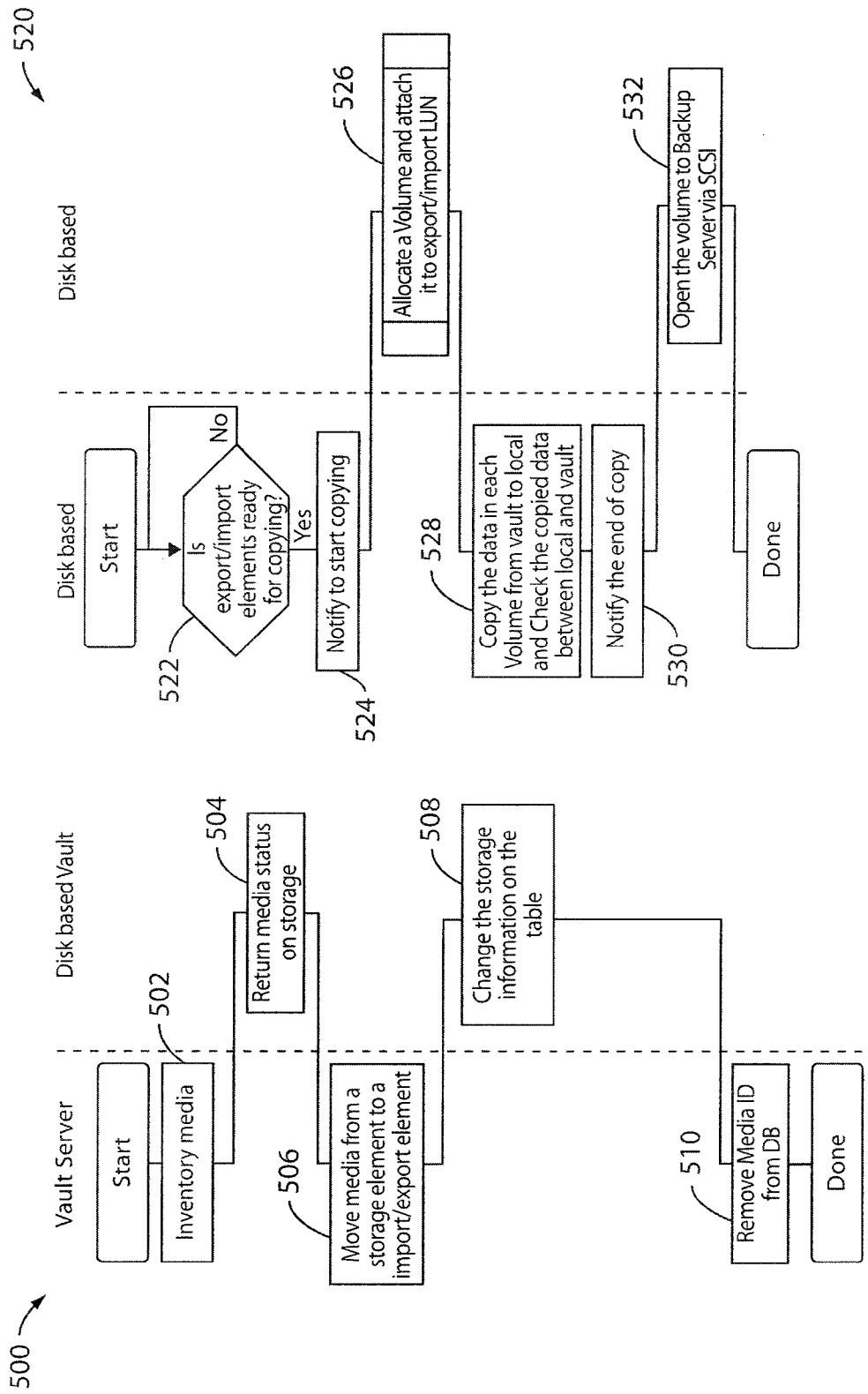
FIG. 12A illustrates a process for transferring data from the storage area to the import/export element according to one embodiment of the present invention.
FIG. 12B illustrates a process for transmitting the selected data from the vault to the library according to one embodiment of the present invention.

FIG. 12A illustrates a process 500 for transferring data from the storage area 340 to the import/export element 338 according to one embodiment of the present invention. The vault server 308 requests an inventory of media from the vault 306, i.e., the disk-based tape library (step 502). The vault returns the media status to the server (step 504), which includes information about the storage element or area, import/export element, volume tag, and the like. The server indicates that selected data, i.e., an emulated tape, is to be moved from the storage element 340 to the import/export element 338 (step 506). The vault simulatively moves the selected data to the import/export element by changing the information provided in the storage field 392 (step 508). At this time the data remain at the same physical storage location, and only the information on the table 390 (see FIG. 5) is changed to reflect the simulative tape transfer. The server removes the media ID from the table 348 to indicate that the selected data has been moved to the import/export element (step 510). The selected data are now provided in the import/export element and ready to be copied to the library 302, so that the data can be reactivated.

FIG. 12B illustrates a process 520 for transmitting the selected data from the vault 306 to the library 302 according to one embodiment of the present invention. The vault 306 checks to see if the import/export element 338 has an emulated tape to be moved to the library (step 522). If so, the vault initiates copying of the emulated tape by notifying the library 302 (step 524) This notification is typically performed by the controller module of the vault. The library allocates a volume and attaches it to a slot in the import/export element 334 that is to receive the emulated tape (step 526). The allocated volume is selected from empty volumes available in the library. The library then sends an acknowledgement to the vault. The vault commences transmitting the data via the communication link 336 and confirms that the data have been copied properly (step 528). The vault indicates that the copy process has been completed (step 530). The library opens the volume whereon the data have been copied, so that the copied data may be accessed by the local server (step 532).

Figure 13B:
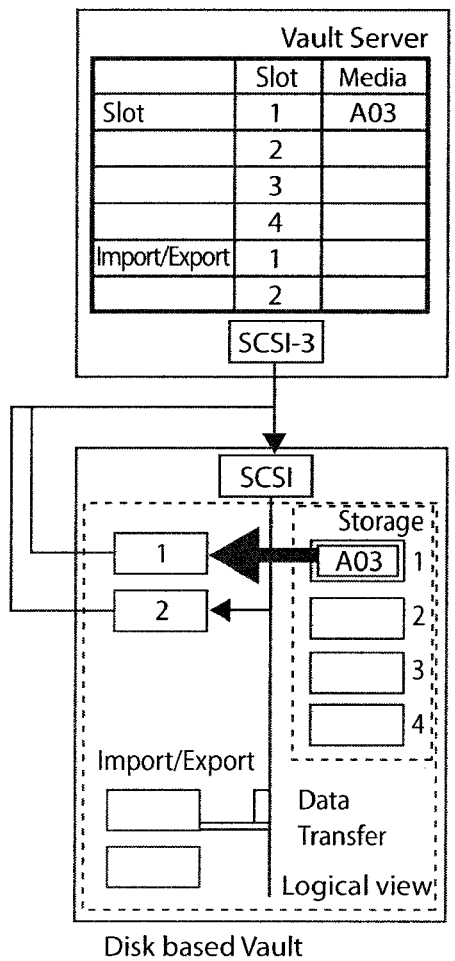
FIGS. 13A and 13B illustrate a method for performing a self-diagnosis according to one embodiment of the present invention.
Figure 13A:
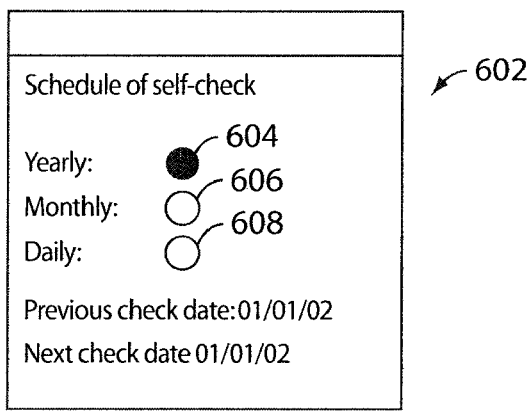

FIGS. 13A and 13B illustrate a method for performing a self-diagnosis according to one embodiment of the present invention. A graphic user interface (GUI) 602 is provided to enable an administrator to schedule a self-check operation (FIG. 13A). The GUI includes a yearly button 604, a monthly button 606, and daily button 608. The administrator may select an appropriate button to instruct the vault to perform periodic checks to at the designated times. At such a designated time, the vault server indicates the emulated tape is inserted into the tape drive and is being rewind (FIG. 13B). However, the vault does not really rewind the tape since the data are physically stored on one or more disks associated with the vault. Rather, the vault performs a self-diagnostic instead of the rewind operation. The types of self-diagnostic may be specified by the administrator according the specific needs.

The present invention has been described in terms of specific embodiments for purposes of illustrating the invention. As will be understood by those skilled in the art, changes, alteration, and modification to the specific embodiments above may be made without departing from the scope of the present invention. Accordingly, the scope of the present invention is to be defined by the appended claims.

What is claimed is:

1. A method for transferring data stored in a first storage system coupled to a first server, the method comprising:

associating a plurality of storage locations on the first storage system to a plurality of emulated tape storage locations;

associating a plurality of emulated tapes to the plurality of emulated storage tape locations to manage data stored in the first storage system as the plurality of emulated tapes;

receiving from the first server an inventory request of media stored in the first storage system, and returning to the first server media status of the media, wherein the first server selects data for a data transfer request based on the media status of the media from the first storage system; and in response to the data transfer request from the first server with information specifying one of the plurality of emulated tapes, transmitting data associated with the specified emulated tape to a second storage system via a communication link between the first storage system and the second storage system, wherein the first storage system and the second storage system each comprise a disk-based storage device, and wherein the media status of the media includes information about a data storage area of the first storage system, an import/export element of the first storage system for data transfer with the second storage system, and volume tags of the emulated tapes in the first storage system.

2. The method of claim 1, wherein the data associated with the specified emulated tape is transmitted via the communication link by using a remote copy operation between the first storage system and the second storage system.

3. The method of claim 1, wherein the second storage system is coupled to a second server different from the first server coupled to the first storage system.

4. The method of claim 1, further comprising freeing up storage capacity of the data in the first storage system associated with the specified emulated tape after copy of data from the specified emulated tape to the second storage system is completed.

5. The method of claim 1, wherein after copy of data from the specified emulated tape to the second storage system is completed, the first storage system indicates that the copy of data has been completed.

6. A method for transferring data stored in a first storage system coupled to a first server, the method comprising:

associating a plurality of storage locations on the first storage system to a plurality of emulated tape storage locations;

associating a plurality of emulated tapes to the plurality of emulated storage tape locations to manage data stored in the first storage system as the plurality of emulated tapes;

receiving from the first server an inventory request of media stored in the first storage system, and returning to the first server media status of the media, wherein the first server selects data for a data transfer request based on the media status of the media from the first storage system; and in response to the data transfer request from the first server with information specifying one of the plurality of emulated tapes, transmitting data associated with the specified emulated tape to a second storage system via a communication link between the first storage system and the second storage system, wherein the second storage system is coupled to a second server different from the first server coupled to the first storage system, wherein the first storage system and the second storage system each comprise a disk-based storage device, and wherein the media status of the media includes information about a data storage area of the first storage system, an import/export element of the first storage system for data transfer with the second storage system, and volume tags of the emulated tapes in the first storage system.

7. The method of claim 6, wherein the data associated with the specified emulated tape is transmitted via the communication link by using a remote copy operation between the first storage system and the second storage system.

8. The method of claim 6, wherein after copy of data from the specified emulated tape to the second storage system is completed, the first storage system indicates that the copy of data has been completed.

9. The method of claim 6, further comprising freeing up storage capacity of the data in the first storage system associated with the specified emulated tape after copy of data from the specified emulated tape to the second storage system is completed.

* * * * *